United States Patent [19]

Morikawa et al.

[11] 4,370,004
[45] Jan. 25, 1983

[54] MAGNETICALLY SUSPENDED TYPE MOMENTUM RING ASSEMBLY

[75] Inventors: Hiroshi Morikawa, Tokyo; Toshiharu Kumazawa, Fujisawa; Hiroshi Takagi, Kamakura, all of Japan

[73] Assignees: Mitsubishi Precision Co., Ltd., Kanagawa; Mitsubishi Electric Corporation, Tokyo, both of Japan

[21] Appl. No.: 194,617

[22] Filed: Oct. 6, 1980

[30] Foreign Application Priority Data

Apr. 28, 1979 [JP] Japan .................................. 54/52044

[51] Int. Cl.³ .............................................. F16C 39/00
[52] U.S. Cl. ..................................................... 308/10
[58] Field of Search ................. 308/10; 244/165, 166; 74/5.4, 5.46

[56] References Cited

U.S. PATENT DOCUMENTS

| | | | |
|---|---|---|---|
| 3,888,553 | 6/1975 | Wehde | 308/10 |
| 3,955,858 | 5/1976 | Poubeau | 308/10 |
| 4,037,886 | 7/1977 | Boden | 308/10 |
| 4,077,678 | 3/1978 | Studer | 308/10 |
| 4,114,960 | 9/1978 | Habermann | 308/10 |
| 4,156,548 | 5/1979 | Anderson | 308/10 |
| 4,211,452 | 7/1981 | Poubeau | 308/10 |
| 4,285,553 | 8/1981 | Robinson | 308/10 |

*Primary Examiner*—R. Skudy
*Attorney, Agent, or Firm*—Merchant, Gould, Smith, Edell, Welter & Schmidt

[57] ABSTRACT

A magnetically suspended type momentum ring assembly is comprised of a momentum ring, a non-contact magnetic bearing provided at a peripheral portion of the ring assembly for imparting suspending support in the radial and axial directions to the ring, a drive arrangement means provided at a peripheral portion of the ring for imparting a rotating force to the ring. The non-contact magnetic bearing includes a magnetic suspension arrangement generating a suspendingly supporting force in the radial direction and a magnetic arrangement generating a suspending supporting force in the axial direction.

8 Claims, 4 Drawing Figures

MAGNETICALLY SUSPENDED TYPE MOMENTUM RING ASSEMBLY

FIELD OF THE INVENTION

This invention relates to a magnetically suspended type momentum ring assembly in which a momentum ring is rotatably supported by a magnetic suspension means.

BACKGROUND OF THE INVENTION

Heretofore, there has been widely employed an anti-friction bearing as a rotation support mechanism for a momentum ring utilizing a physical inertia of a rotating body, such as a spinning wheel for a gyroscope, a flywheel for controlling an attitude of a flying object, a flywheel for storing energy. However, as known, the anti-friction bearing involves a mechanical friction due to contact between a roller or a ball and a race. Especially, the mechanical friction has a great influence on control performance of the flywheel for controlling the attitude of the flying object and it has been a task of importance to minimize the friction. To accomplish the task, it is generally required to employ an anti-friction bearing having a size as small as possible. On the other hand, the rotation support mechanism must inevitably have a large structure at a portion around a rotation axis because of requirements for strength and accuracy and a mass is centered on that portion so that a major portion of the entire mass of the momentum ring is located there. Because of this, there is a limit in structure to increase an effective mass for enhancing inertia efficiency with respect to a rotation center.

Furthermore, if the rotation support mechanism is concentratedly provided around the rotation axis, it is necessary to employ an anti-friciton bearing of a large size to increase support rigidity with respect to the rotation axis against an external force. This requirement is incompatible with the requirement that the anti-friction bearing of smaller size be employed to reduce the mechanical friction.

Recently, a non-contact bearing utilizing a magnetic force has been used practically as the rotation support mechanism and produced satisfactory results in eliminating the mechanical friction. However, the known structure employing this type of support mechanism has a magnetic bearing mechanism at a central portion of the momentum ring as in the conventional anti-friction bearing support mechanism. This structure is effective for elimination of the mechanical friction, but it does not bring the intended result of effective distribution of a mass contributive to the support rigidity and the inertia efficiency for the rotation center.

SUMMARY OF THE INVENTION

It is the object of the present invention to obviate the disadvantages of the conventional momentum ring support mechanism as described above. More specifically, it is the object of the present invention to provide a new magnetically suspended type momentum ring assembly devised in view of the aforesaid disadvantages which utilizes necessary a magnetically suspending mechanism which is free from mechanical friction and concentrates the mass of a momentum ring at a peripheral portion thereof by a means for supporting the peripheral portion of the momentum ring without contact therewith so as to effectively distribute a mass contributive to inertia efficiency for a rotation center and to highly increase support rigidity against an external force.

With the magnetically suspended type momentum ring assembly of the present invention, suspension of the momentum ring in the radial direction is directly effected by suspension of the peripheral portion, where the mass of the momentum ring is concentrated, through a magnetic force of a permanent magnet means provided on the momentum ring and a fixed member having a configuration confronting the momentum ring, so that a supporting force for the momentum ring against an external force can be increased very much as compared with the conventional structure in which a ring is supported around the rotation center thereof. On the other hand, suspension of the momentum ring in the axial direction is controlled by a permanent magnet provided at the peripheral portion of the momentum ring in cooperation with electromagnetic coils mounted on the fixed member so as to confront opposite ends of the permanent magnet. A control current having a direction and a magnitude corresponding to those of an external force in the axial direction is supplied to the electromagnetic coils so that displacement of the momentum ring caused by the external force may be balanced with a magnetic force exerted by the electromagnetic coils. This control means can reduce a control current to be supplied to the electromagnetic coils as compared with a conventional control means which relatively keeps the momentum ring and the stator in a fixed position. In addition, since a rotation drive means is provided at the peripheral portion of the momentum ring integrally with the rotation support means, the distance of the rotation drive means from the rotation center can be elongated, so that rotation drive torque can be increased thereby to enable reduction of the drive current and factilitate the control of the rotation rate and direction. Thus, the magnetically suspended momentum ring assembly of the present invention can eliminate the support mechanism at the rotation center which is essential to the conventional momentum ring assembly. Therefore, the momentum ring may have, according to use, any desired configulation, which is capable of effectively distributing a mass contributive to the inertia efficiency for the rotation center, such as an annular shape, a thin disk shape, and a shape of a bead on an abacus having two truncated cones with their bases combined. It is to be noted that the magnetically suspended type momentum ring assembly of the present invention can be used irrespective of the direction of the rotation center of the momentum ring.

The invention will be described more specifically referring to the accompanying drawings in which.

DESCRIPTION OF THE EMBODIMENTS

Figure 1A:
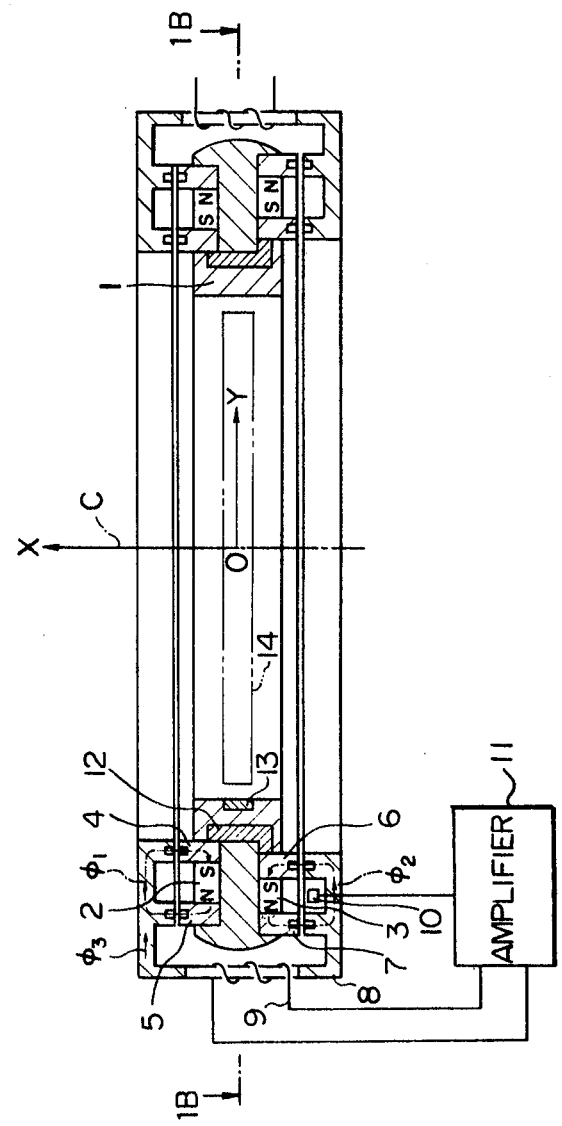
FIG. 1A is a sectional view of one form of a magnetically suspended type momentum ring assembly embodying the present invention.
Figure 1B:
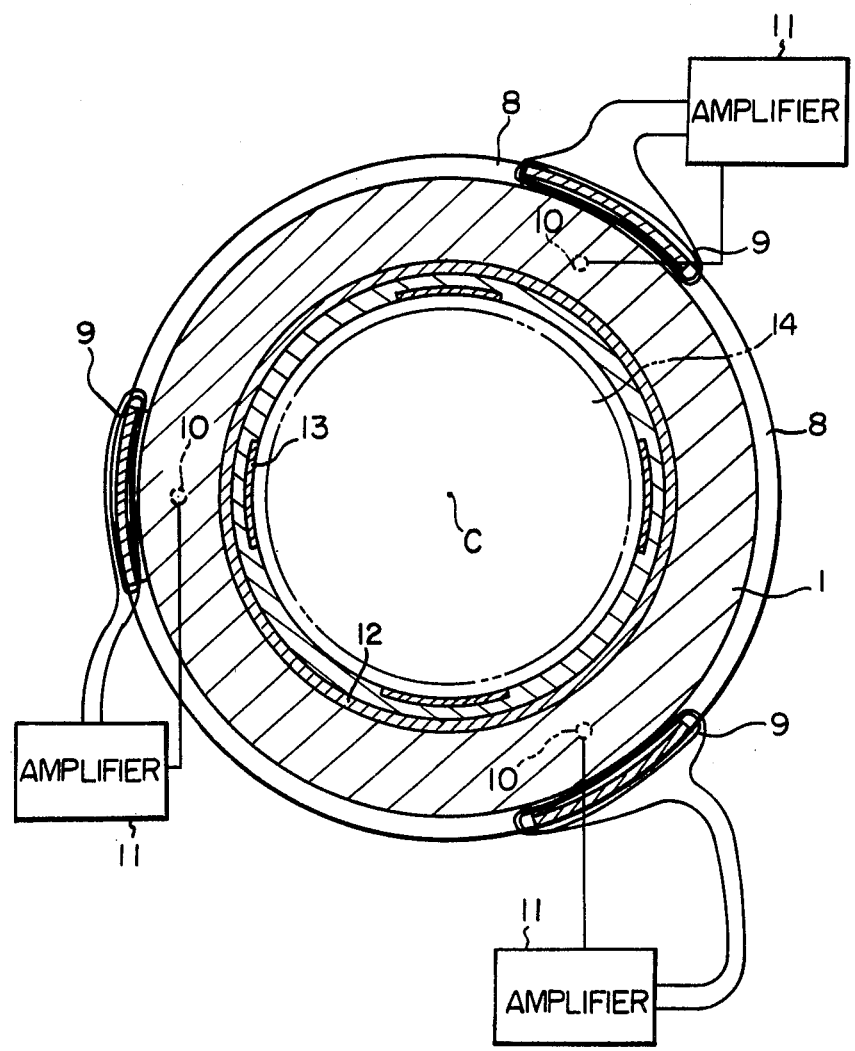
FIG. 1B is a horizontal cross section view taken along the line 1B—1B of FIG. 1A.

FIGS. 1A and 1B are sectional views of one form of the magnetically suspended type momentum ring assembly in accordance with the present invention. A momentum ring 1 having a rotation axis C is provided with annular permanent magnets 2 and 3 and magnetic pole members 4, 5, 6 and 7 which serve as a first magnetic suspension apparatus for generating first and second magnetic attractions for supporting the momentum ring in a radial direction. The magnetic pole members 4 and 5 and the magnetic pole members 6 and 7 are mounted so as to be close to the permanent magnets 2 and 3, respectively, and opposed to an annular fixed member 8 made of a magnetic material so as to close magnetic circuits of magnetic flux $\phi_1$ and $\phi_2$ emanating from the permanent magnets 2 and 3, respectively, to exert a force in the radial direction indicated by Y on the momentum ring 1 in a direction for eliminating deviation in the radial direction from an equilibrium point 0 of the magnetic force and to suspend the momentum ring 1 near the equilibrium point. Grooves are formed on faces of the magnetic pole members 4, 5, 6 and 7 and the fixed member 8 which confront each other to increase a physical rigidity by the magnetic force in the radial direction. As to support of the momentum ring in the axial direction indicated by X, a second magnetic suspension apparatus for generating a third magnetic attraction, is utilized. The permanent magnets 2 and 3 and so disposed that the direction of the magnetic flux $\phi_1$ and $\phi_2$ emanating from the N-poles of the respective magnets 2 and 3 and extending to the respective S-poles may be the same so that there is caused a difference in magnetic flux and accordingly in magnetic forces between the magnetic flux $\phi_1$ and magnetic flux $\phi_2$ by magnetic flux $\phi_3$ generated when a current is supplied to the electromagnetic coils 9. Since the momentum ring 1 deviates more and more from the magnetic equilibrium point 0 by the magnetic attraction force of the magnetic flux $\phi_1$ or $\phi_2$ as the ring 1 deviates from the equilibrium point in the axial direction, suitable detectors 10 are provided to detect the deviation. The detection may be carried out, for example, by a conventional flux leakage detector so as to detect a deviation speed of the momentum ring 1 in the X-direction caused by change in the leaked magnetic flux. The result of the detection is amplified by amplifiers 11 and applied to the electromagnetic coils 9 to generate the magnetic flux $\phi_3$. The momentum ring 1 is suspended at an equilibrium point where a force corresponding to the difference in magnetic flux between the magnetic flux $\phi_1$ and $\phi_2$ caused by the magnetic flux $\phi_3$ is balance with an external force. This suspension method can reduce a current required for supporting the momentum ring 1. A magnetic piece 12 forms a magnetic return circuit of the magnetic flux $\phi_3$. The amplifier 11 has a signal processing function for stably supporting the momentum ring 1 around the equilibrium point 0. A drive mechanism for imparting rotation to the momentum ring 1 is provided on the periphery of the momentum ring 1 or inside of an annular portion of the momentum ring 1 at a position adjacent thereto. More specifically, in FIGS. 1A and 1B, 13 denotes magnet pieces embedded in the momentum ring 1 and a stator 14 cooperative therewith has an excitation winding. The magnet pieces 13 and the stator 14 provide one form of the drive mechanism. By imparting a driving force to the annular portion of the momentum ring 1 relative to the rotation center of the momentum ring 1, torque can be increased.

In the embodiment of FIGS. 1A and 1B, three electromagnetic coils 9 are provided on the fixed member 8 so as to provide a rigid and stable magnetic suspension for the momentum ring 1. The three electromagnetic coils 9 are connected to the respective amplifiers 11, and are equiangularly arranged around the circumference of the momentum ring 1. The respective amplifiers 11 are electrically connected to respective deviation detectors 10 which are disposed adjacent to respective electromagnetic coils 9.

It should be understood that the precession of the momentum ring 1 caused by the gyro effect of ring 1 can be compensated for by the utilization of an appropriate operation means (not illustrated in FIGS. 1A and 1B). Further, the precession of the momentum ring 1 may be caused so that a torque is applied to the fixed member 8. As a result, the rotation of the momentum ring assembly can be controlled.

Although the same magnetic circuit is employed for magnetic suspension in both the axial and the radial directions in the embodiment as described above, the invention is not limited to this structure and separate and independent magnetic circuits may be employed. Furthermore, although the description refers only to the momentum ring of an annular shape, the momentum ring may have any configuration which can allow the magnetic suspension mechanism to be arranged at the peripheral portion of the momentum ring assembly, such as the shape of a flat plate, the shape of a bead on an abacus, or a cylindrical shape, to concentrate an effective mass at the peripheral portion of the momentum ring 1 and increase the rotation torque.

Figure 2:
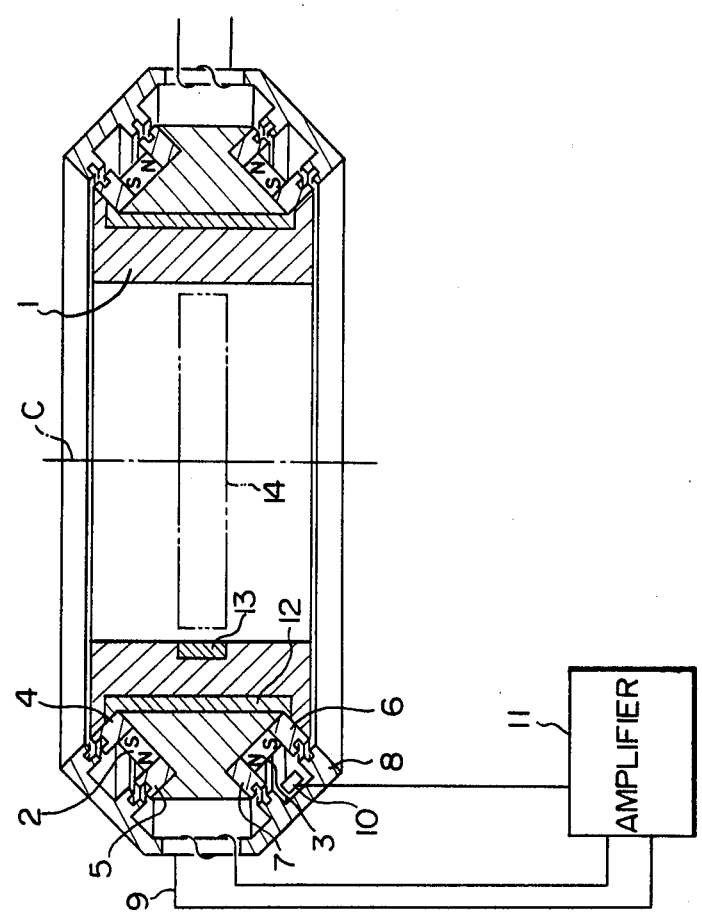
FIGS. 2 and 3 are sectional views of second and third embodiments of the present invention, respectively.
Figure 3:
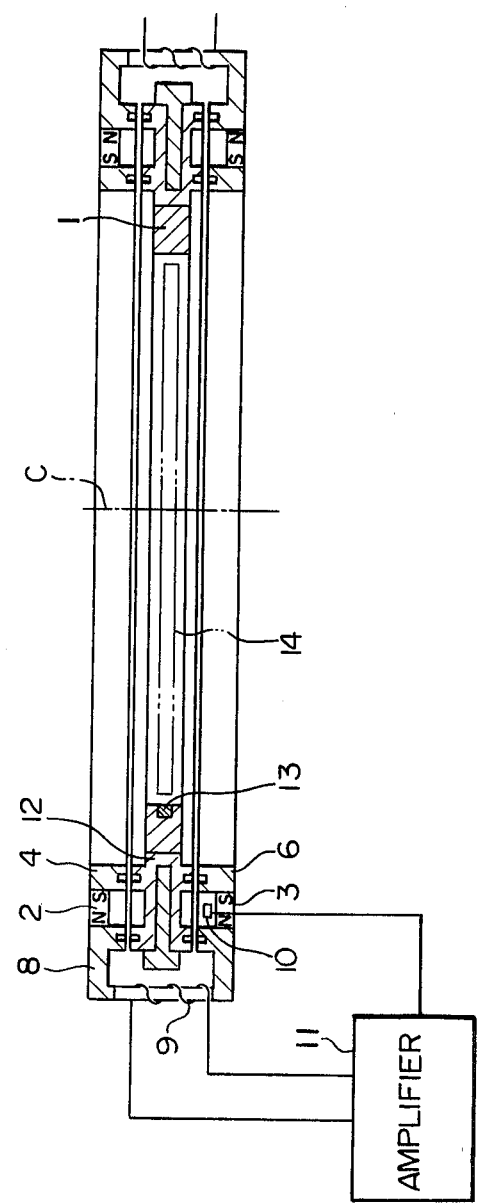

Another embodiment of the present invention in which the permanent magnets are disposed at an angle to support the momentum ring in both the axial and the radial direction is illustrated in FIG. 2, and a further embodiment in which the momentum ring 1 is formed in a thin plate shape is illustrated in FIG. 3. In the embodiments of FIGS. 2 and 3, the same reference numerals indicate the same elements as in the embodiment of FIGS. 1A and 1B. In the embodiment of FIG. 3, the detector 10 detects a change in the leaked magnetic flux of the magnet piece 13 of the drive means embedded in the momentum ring 1 to detect deviation of the momentum ring 1.

In the foregoing embodiments, it is desired to prevent the momentum ring 1 from magnetically contacting the fixed member 8 upon interruption of the control current to the electromagnetic coil 9 during rotation of the momentum ring 1. To this end, there may be provided, preferably at a peripheral portion of the momentum ring 1 or at the center of the ring according to necessity, an anti-friction bearing which is kept from contact when the control current is normally supplied to the electromagnetic coils 9 and brought into contact when the displacement of the momentum ring 1 exceeds a predetermined value due to interruption of the current.

While the invention has been described above in connection with specific emboidments, the invention is not limited thereto or thereby, and the invention is operative if modified within the basic concept of the invention.

As apparent from the foregoing description, the present invention has such an advantage that the rate of the angular momentum to the total mass of the momentum ring and the support rigidity against the external force can be increased and has a remarkable effect when applied to magnetically suspended type momentum ring assemblies.

We claim:

1. A magnetically suspended type momentum ring assembly comprising:
   a rotatable momentum ring having a rotating axis in the center of said ring, and an annular solid portion thereof whereto an effective mass of said momentum ring is concentrated;

a fixed member provided for enclosing therein said rotatable momentum ring;

a non-contact magnetic bearing means for generating a force for suspendingly supporting said rotatable momentum ring in a radial and an axial direction within said fixed member, said magnetic bearing means being arranged in a peripheral portion of said momentum ring assembly;

said non-contact magnetic bearing means comprising a first magnetic suspension means including permanent magnet means generating first and second magnetic attractions which are axially opposite to one another and act between said momentum ring and said fixed member, and a second magnetic suspension means including electro-magnet means generating a third axial magnetic attraction varying in response to a change in electric current applied to said electro-magnet means, said first and second magnetic attractions contributing to suspension of said momentum ring in said radial direction, and a combination of said first through third magnetic attractions contributing to the suspension of said momentum ring in said axial direction;

means for controlling the electric current applied to said electro-magnet means in response to changes in direction and magnitude of an external force acting on the momentum ring in the axial direction; and a drive means for rotating said momentum ring about said rotating axis, said drive means being provided in said peripheral portion of said momentum ring assembly.

2. A magnetically suspended type momentum ring assembly according to claim 1, wherein said permanent magnet means of said first magnetic suspension means are a pair of annular permanent magnets, each being embedded in each of two axial end faces of said annular solid portion of said momentum ring.

3. A magnetically suspended type momentum ring assembly according to claim 1, wherein said permanent magnet means of said first magnetic suspension means are a pair of annular permanent magnets, each being attached to each of the axially confronting two inner faces of said fixed member.

4. A magnetically suspended type momentum ring assembly according to claim 1, wherein said permanent magnet means of said first magnetic suspension means are a pair of annular permanent magnets, each being embedded in each of two outer corners of said momentum ring, so as to be disposed at an angle with respect to said rotating axis of said momentum ring, whereby magnetic attractions in radial directions are generated by said pair of annular permanent magnets.

5. A magnetically suspended type momentum ring assembly according to claim 1, wherein said electro-magnet means of said second magnetic suspension means comprises a plurality of electrically exciting windings provided for said fixed member.

6. A magnetically suspended type momentum ring assembly according to claim 1, wherein said drive means comprises an electro-magnetic means applying a rotating force to said annular solid portion of said momentum ring.

7. A magnetically suspended type momentum ring assembly according to claim 1, further comprising means for detecting axial displacement of said momentum ring with respect to said fixed member.

8. A magnetically suspended type momentum ring assembly comprising:

a rotatable momentum ring having a rotating axis in the center of said ring, and an annular solid portion thereof whereto an effective mass of said momentum ring is concentrated;

a fixed member provided for enclosing therein said rotatable momentum ring;

a non-contact magnetic bearing means for magnetically supporting said rotatable momentum ring in radial and axial alignment within said fixed member, said magnetic bearing means being positioned proximate the periphery of said momentum ring assembly;

said non-contact magnetic bearing means including permanent magnet means for generating first and second magnetic flux, said permanent magnetic means being angularly disposed so as to axially and radially support said momentum ring relative to said fixed member, said bearing means further including electromagnet means generating a third magnetic flux in response to a change in electric current applied to said electro-magnet means, said permanent magnet means and said electro-magnet means being constructed and arranged to cooperate with each other such that said third flux causes a difference in magnetic flux between said first and second flux whereby a force corresponding to the difference in said first and second flux is created to assist said permanent magnet means in axially supporting said momentum ring within said fixed member; and means for controlling the electric current applied to said electro-magnet means in response to changes in direction and magnitude of an external force acting on the momentum ring and the axial direction.

* * * * *

UNITED STATES PATENT AND TRADEMARK OFFICE
CERTIFICATE OF CORRECTION

PATENT NO. : 4,370,004
DATED : January 25, 1983
INVENTOR(S) : Hiroshi Morikawa and Toshiharu Kumazawa and Hiroshi Takagi It is certified that error appears in the above—identified patent and that said Letters Patent is hereby corrected as shown below:

In the Abstract, lines 5-6, "a drive arrangement means" should be -- a drive arrangement--.

In the Abstract, line 8, "magnetic bearing" should be --magnetic bearing arrangement--.

Column 2, line 36, "factilitate" should be --facilitate--.

Column 2, line 42, "configulation" should be --configuration--.

Column 3, line 21, "and" (second occurrence) should be --are--.

Column 4, line 51, "emboidments" should be --embodiments--.

Signed and Sealed this

Sixth Day of September 1983

[SEAL]

Attest:

GERALD J. MOSSINGHOFF

Attesting Officer

Commissioner of Patents and Trademarks